United States Patent [19]

Bonuchi et al.

[11] Patent Number: 4,561,148
[45] Date of Patent: Dec. 31, 1985

[54] MACHINE FOR PULLING VISCERA PACKAGE FROM FOWLS

[75] Inventors: James A. Bonuchi, Overland Park, Kans.; Frank J. Criscione, II, Kansas City, Mo.

[73] Assignee: Simon-Johnson, Inc., Kansas City, Kans.

[21] Appl. No.: 658,407

[22] Filed: Oct. 5, 1984

[51] Int. Cl.[4] .............................................. A22C 21/06
[52] U.S. Cl. ............................................. 17/11; 17/45
[58] Field of Search ...................................... 17/11, 45

[56] References Cited

U.S. PATENT DOCUMENTS

| Re. 28,666 | 12/1975 | Harben | 17/11 |
|---|---|---|---|
| 1,798,585 | 3/1931 | Bookheim | 17/11 |
| 2,237,196 | 4/1941 | Pomieraneic | 198/179 |
| 2,237,197 | 4/1941 | Pomieraneic | 198/179 |
| 2,975,469 | 3/1961 | Viscolosi | 17/11 |
| 3,474,492 | 10/1969 | Viscosi | 17/11 |
| 3,685,096 | 4/1972 | Harben, Jr. | 17/11 |
| 3,958,303 | 5/1976 | Scheier et al. | 17/11 |
| 4,184,230 | 1/1980 | Fox et al. | 17/11 X |
| 4,251,901 | 2/1981 | Thomas et al. | 17/11 X |
| 4,262,387 | 4/1981 | Scheier et al. | 17/11 |
| 4,467,498 | 8/1984 | Graham et al. | 17/11 |

FOREIGN PATENT DOCUMENTS 7601640  8/1976  Netherlands .......................... 17/11

Primary Examiner—Willie G. Abercrombie
Attorney, Agent, or Firm—Schmidt, Johnson, Hovey & Williams

[57] ABSTRACT

In the evisceration of poultry a special, slender tool is guided into the body cavity of the bird through an opening at the vent. A small diameter connection between the crop and the stomach is hooked by a finger on one end of the tool which swings into gathering relation to such connection after insertion is complete. The hook-like finger brings the viscera connection against a post, rigid to the tool adjacent the finger, all without any squeezing, pinching or clamping or other damaging action. The connection is draped over the bight of the finger and between a pair of anti-slippoff abutments such that the fold-over, wrap-around wrapping action effectively captures the connection before the pull-out motion commences. The swinging return of the finger to its normal position, for release of the viscera package, takes place only after the tool, including its guide, its post and its finger are outside the body cavity.

15 Claims, 14 Drawing Figures

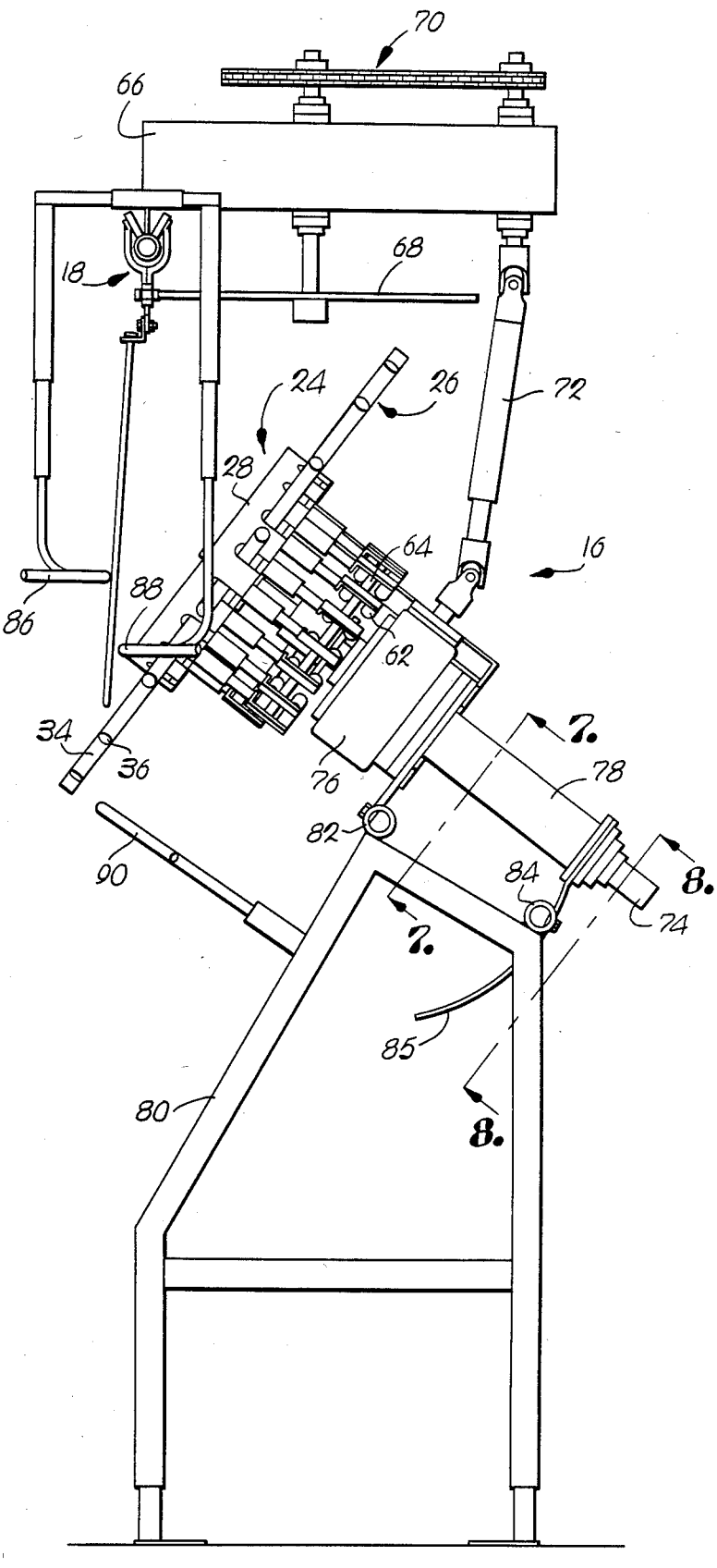
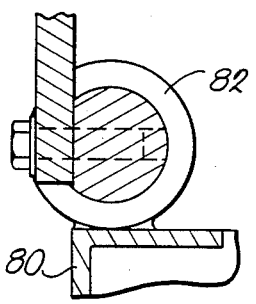
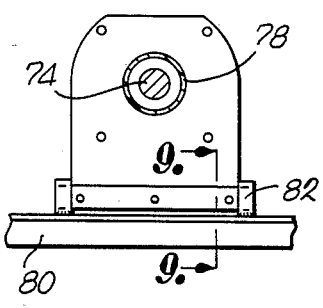
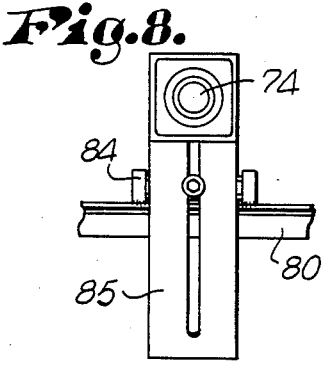

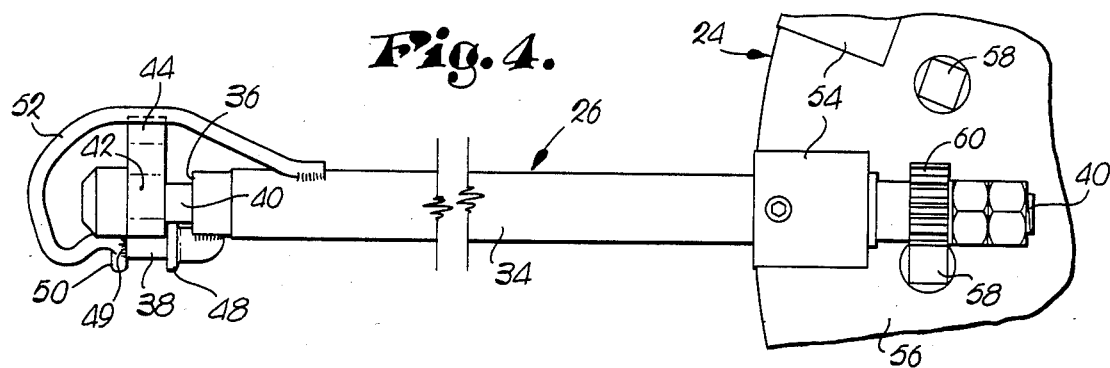
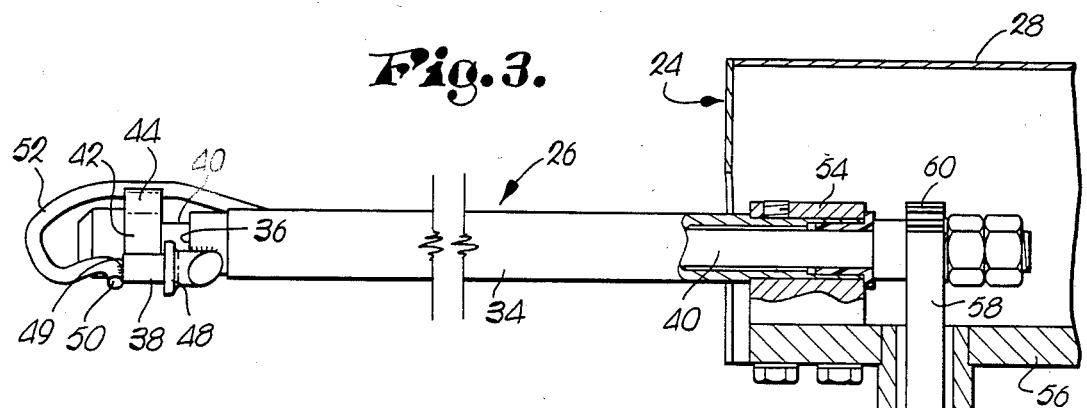
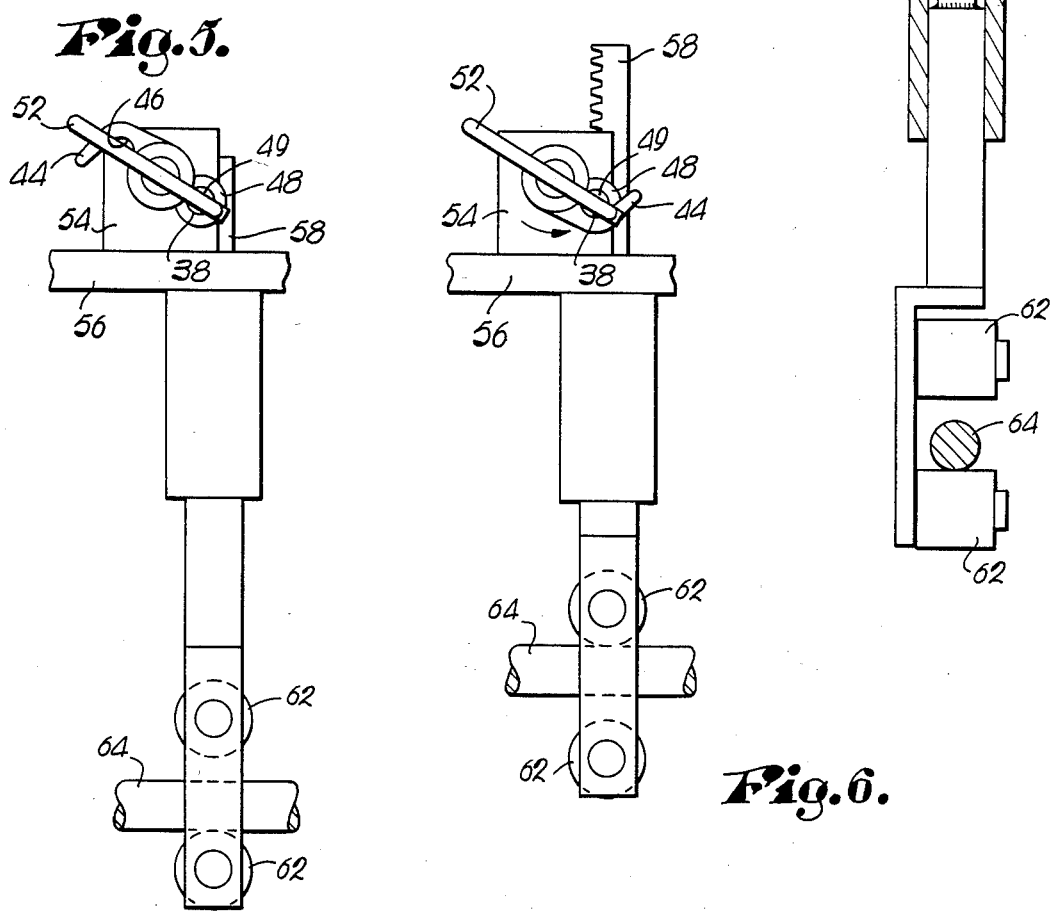

MACHINE FOR PULLING VISCERA PACKAGE FROM FOWLS

BACKGROUND OF THE INVENTION

As an improvement in the rapid, automatic and economical processing of poultry on a commercial scale, our present invention relates to the successive evisceration of a series of birds as they are advanced continuously suspended by their legs through use of shackles depending from an overhead conveyor. Prior to reaching our machine for pulling the viscera package therefrom, the birds are defeathered, an opening is provided at the vents and, normally, the heads are removed.

Also, the gizzard, intestines and vent will have been pulled out of the cavity and draped over the side of the bird. The upwardly and inwardly facing openings are exposed to a row of tools radiating outwardly in spoke-like fashion from a slightly inclined rotor that is, in turn, timed in accordance with the speed of the conveyor. Thus, each opening receives a single tool which is inserted into the cavity to a point of capture of a portion of the viscera package.

The tool is guided into the cavity and after it is fully inserted, a finger performs a gathering action by swinging to a point of hooking around a relatively small diameter connection between the crop and the stomach. Such viscera portion is then brought to bear against and in partial surrounding relationship to a rigid post on the tool without any severe grasping, clamping, pinching or other damaging action.

Spaced abutments on the post prevent slip-off, and the viscera connection becomes more-or-less entwined, first between the finger and one of the abutments, then across the bight of the finger between the post and such bight, and finally between the finger and the other post. It is the resulting twining in a sinuous manner for attaching the viscera connection to the tool which is utilized for effectively joining the package to the tool before pull-out commences. And no more movement of the finger within the confined space in the body cavity take place until the finger and the package are outside the cavity, whereupon the finger is returned to its releasing position.

IN THE DRAWINGS:

FIG. 2 is a side elevational view thereof;

FIG. 3 is an enlarged, fragmentary, side elevational view of one of the eviscerating tools showing the finger actuator, certain parts being broken away and in section for clearness;

FIG. 4 is a view similar to FIG. 3 showing the inner end of the finger actuating rack and associated pinion;

FIG. 5 is an end elevational view of one of the tools shown associated with the camming track for the racks and the associated rollers;

FIG. 6 is a view similar to FIG. 5 but showing the rack at the opposite end of its path of travel;

Figure 10:
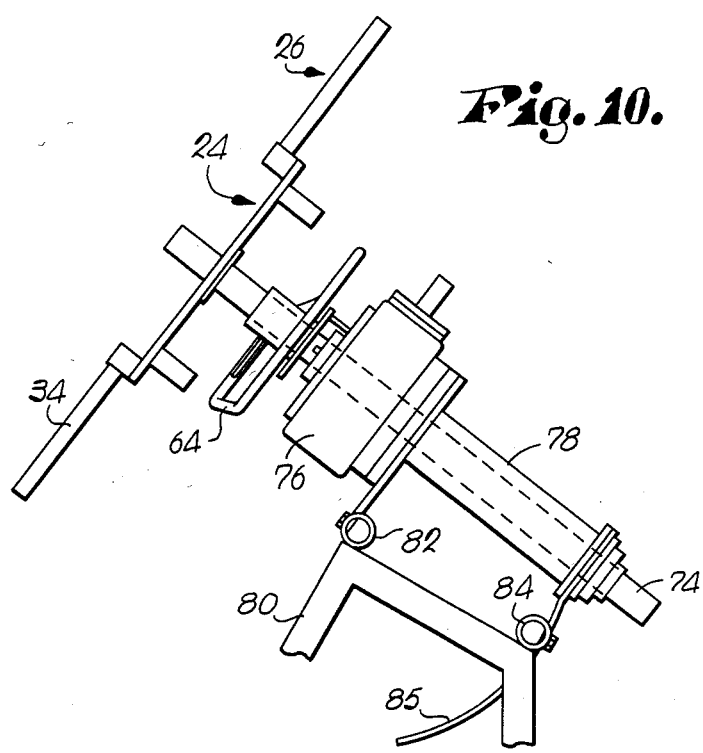
Figure 13:
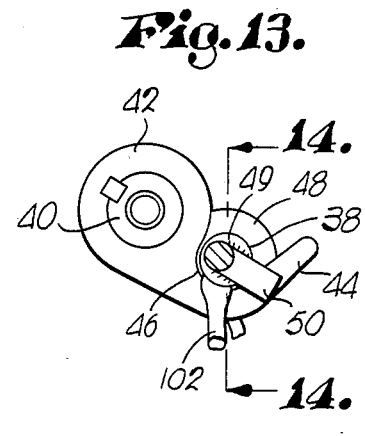
Figure 11:
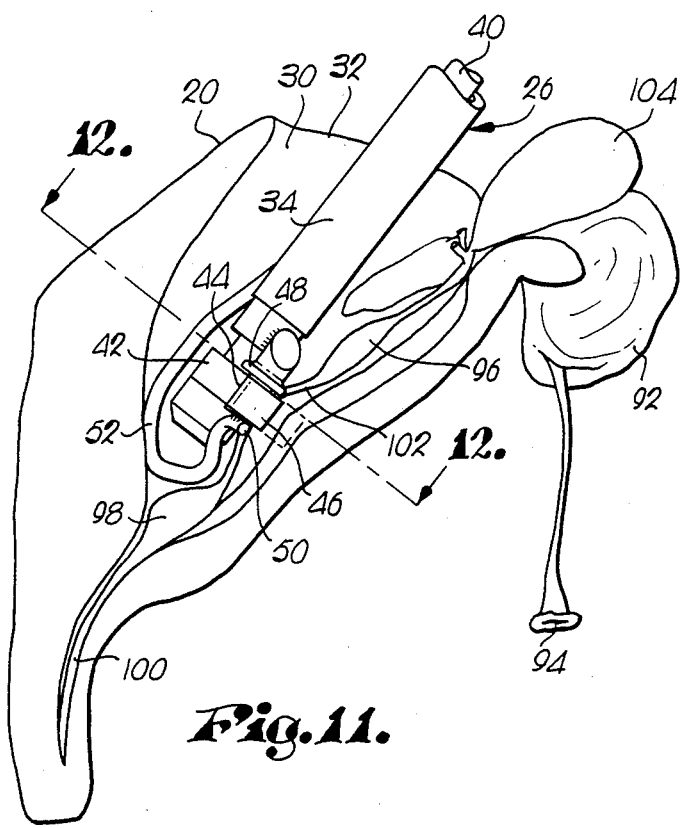
Figure 12:
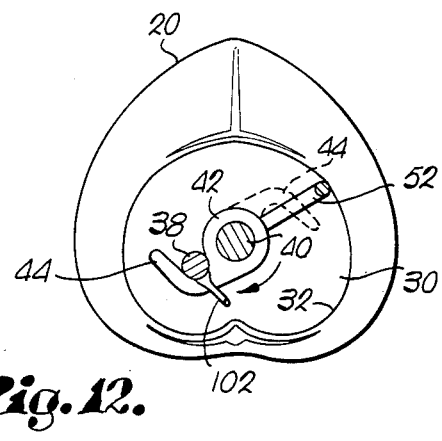

FIGS. 7 and 8 are fragmentary, detailed, cross-sectional views taken on lines 7—7 and 8—8 of FIG. 2;

FIG. 9 is a fragmentary, detailed cross-sectional view taken on line 9—9 of FIG. 2;

FIG. 10 is a view partially the same as FIG. 2 showing the rotor shaft and, schematically the tools as well as the camming track;

FIG. 11 is an enlarged, fragmentary view showing the tool extended into the body cavity of the bird;

FIG. 12 is a cross-sectional view taken on line 12—12 of FIG. 11;

FIG. 13 is an end elevational view of one of the tools; and

Figure 14:
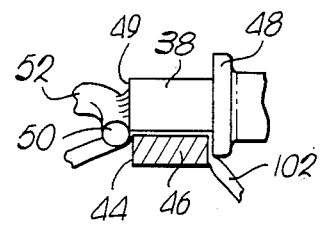

FIG. 14 is a cross-sectional view taken on line 14—14 of FIG. 13.

DESCRIPTION OF THE PREFERRED EMBODIMENT

Figure 1:
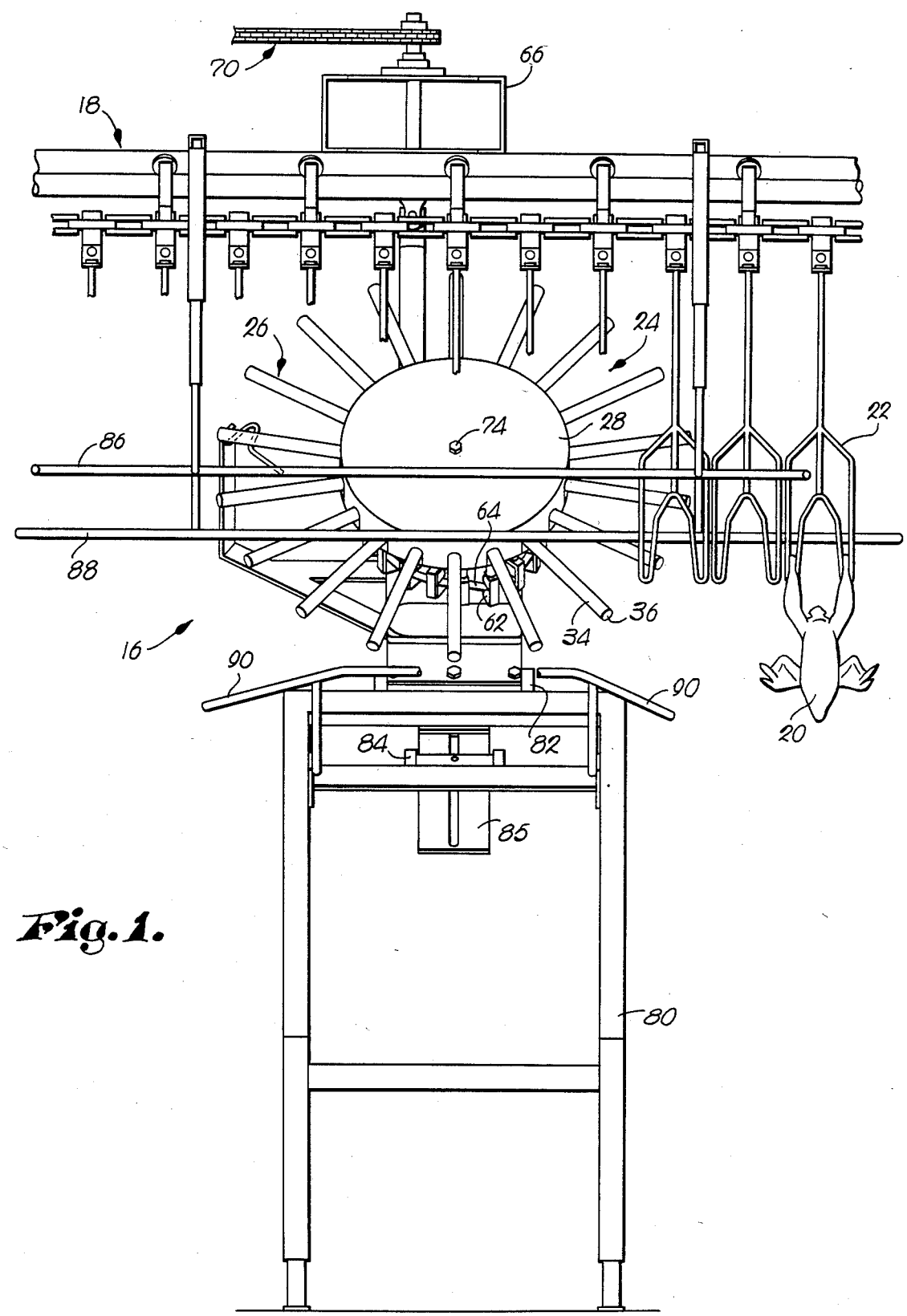
FIG. 1 is a front elevational view of a machine for pulling viscera package from fowls made in accordance with our present invention.

As best can be understood by initial viewing of FIGS. 1 and 2, a poultry eviscerating machine 16 is operably associated with an overhead conveyor 18 for continuously and consecutively advancing birds 20 right to left (FIG. 1) suspended by their legs from shackles 22. The machine 16 includes a rotor 24 which rotates uninterruptedly clockwise (FIG. 1) at a speed synchronized with the speed of advancement of the birds 20 such that spoke-like tools 26, extending radially outwardly from inclined hub 28, enter bird cavities 30 through an opening 32 at the vents (FIG. 11) and are withdrawn therefrom as the tools 26 and the birds 20 continue to advance beyond the zone of evisceration.

The tools 26 are identical and each includes an elongated tube 34 rigidly carried by the hub 28 for rotation therewith and provided with a terminal end 36 remote from the circular periphery of the hub 28. An elongated rod-like post 38 is welded or otherwise fixed to the outer face of the tube 34 at the end 36 and extends outwardly beyond the latter. An elongated shaft 40 extends entirely through the tube 34 for oscillation relative thereto about the longitudinal axis of the shaft 40. Such axis is parallel to the longitudinal axis of the tube 34 and to the longitudinal axis of the post 38, with the post 38 spaced from the shaft 40 as shown, for example, in FIGS. 12 and 13.

Keyed to the shaft 40 (FIG. 13) for oscillation therewith adjacent the end 36 and the post 38 is a collar 42 provided with an integral, curved finger 44 having a concave bight 46 which matches the convex configuration of the post 38. The finger 44 is disposed for swinging movement toward and away from the post 38 during oscillation of the shaft 40 as seen in FIG. 12. See also FIGS. 11, 13 and 14. Thus, when the finger 44 is in the position shown in FIGS. 13 and 14, and by full lines in FIG. 12, it is essentially in hooked relationship to the post 38.

When in such position, the finger 44 is disposed between a flange 48 integral with and surrounding the post 38 adjacent the end 34, and a prong 50 welded across outer, free end 49 of the post 38. The flange 48 and the prong 50 serve as spaced abutments in the manner hereinafter to be made clear. As can best be understood from FIGS. 3, 4 and 11, a somewhat J-shaped, rod-like guide 52, looped about the finger 44, is rigidly secured at one of its ends to the outer face of the tube 34 inwardly of the end 36. The opposite end of the guide 52 is hook-shaped, presenting the prong 50 which projects slightly beyond the end 49.

Any suitable structure may be provided for rotating the hub 28 and simultaneously oscillating the shafts 40 in response to such rotation. For example, the tubes 34 extend into the hub 28 (FIG. 3) and the rigidly carried therewithin by sleeves 54 bolted to a plate 56 forming a part of the hub 28. The plate 56 carries a reciprocable rack 58 in mesh with a pinion 60 secured to the shaft 40, and each rack is actuated by rollers 62 thereto connected and disposed above and below a camming track 64. (See also FIGS. 4–6).

The support 66 (FIGS. 1 and 2) suspends a disc 68 driven by the conveyor 18 and, through a chain and sprocket wheel connection 70, for rotating the rotor 24 through a universal shaft 72. The shaft 72 rotates a shaft 74 through a gear reducer 76.

The shaft 74, rigid to the hub 28, is rotatable in a tube 78 carried by a stand 80 by means of pivots 82 and 84, the latter being, in turn equipped with releasable attachment to an arcuate guide 85, all for adjustment purposes such as to provide the proper inclination of the shaft 74, and, therefore, the rotor 24.

Guides 86 and 88 for the shackles 22 are suspended from the overhead conveyor assembly, and guides 90 for the birds 20 are mounted on the stand 80 such that the openings 32 are properly presented to the tools 26 as the birds arrive at the machine 16.

In FIG. 11 there is shown, at least schematically, portions of the viscera of the bird 20, including the intestine 92, the vent 94, the stomach 96, the crop 98, the esophagus 100, the connection 102 between the stomach 96 and the crop 98 and the gizzard 104.

OPERATION

Normally the defeathered birds 20 are advanced to the machine 16 by the conveyor 18 in the condition shown in FIG. 11 with the heads removed, the opening 32 cut therein and portions of the viscera (intestine 92, vent 94 and gizzard 104) hanging loosely outside the bird 20. Within the bird 20, remaining attached, are the stomach 96, the crop 98, the esophagus 100 and the connection 102.

The disc 68 and the shaft 72 are driven simultaneously at predetermined relative speeds by the conveyor 18 to continuously turn the rotor 24 and to effect continuous advancement of the shackles 22, and therefore, the birds 20 toward the machine 16. The shackles 22 and the birds 20 are oriented properly by the guides 86, 88 and 90 such as to cause each opening 32 to be in a position for receiving a consecutive tool 26 as the birds 20 arrive consecutively at the zone of entrance to the machine 16. Manifestly, each successive opening 32 receives a successive one of the tools 26.

As the bird 20 continues to advance and as the rotor 24 continues to rotate, the tool 26 is inserted progressively deeper into the cavity 30 until the finger 44 reaches the zone of the viscera connection 102, as shown in FIG. 11. All the while the guide 52 tends to deflect the finger 44 toward the connection 102 and, more particularly prevents "hang-up" of the components of the tool 26 along the inner walls of the bird 20 which form the cavity 30.

The camming track 64, acting on the upper roller 62 causes the rack 58 to ascend (FIG. 6) and thereby actuate the pinion 60, rotating the shaft 40 and start swinging the finger 44 toward the post 38 after the latter has entered the cavity 30. At about the time the finger 44 arrives in the vicinity of the connection 102 it hooks around the connection 102 in a gathering action, moving the connection 102 toward and then against the post 38 as shown in FIG. 11.

Accordingly, the connection 102 becomes looped through and across the finger 44 within its bight 46 and is brought into engagement with the post 38 in the manner depicted by FIGS. 11–14. Noteworthy at this juncture is the position of the finger 44 between the flange 48 and the prong 50, the way in which the connection is interposed between the finger 44 and the flange 48 and the disposition of the prong 50 between the connection 102 and the finger 44.

Therefore, the wrap-around of the visera connection 102 with respect to the bight 46 of the finger 44 is maintained without slippage therefrom (prevented by the flange 48 and the prong 50) as the viscera pack is pulled from the cavity 30. No great amount of squeezing or gripping of the connection 102 between the finger 44 and the post 38 is needed or desired, eliminating tearing apart or breakage of the connection 102 away from the stomach 96 and the crop 98. The entire package, including the esophagus 100, the crop 98 and the stomach 96 is pulled from and out of the cavity 30 for release after the tool 26 rises and advances arcuately and as the eviscerated bird 20 continues to advance horizontally beyond the central zone of the machine 16, such zone being directly below the axis 74 of rotation of the rotor 24.

To be understood, of course, is the fact that after retraction of the tool 26 by rotation of the roller 24, the camming track 64 acts on the lower roller 62 to return the rack 56 to the position shown in FIG. 5, causing swing-back of the finger 44 after the finger 44 is outside the cavity 30 and its release of the viscera connection 102. All the viscera parts 92–104 are then free to fall to a suitable collecting vessel (not shown) located below and to the left of the machine 16, viewing FIG. 1.

Having thus described the invention, what is claimed as new and desired to be secured by Letters Patent is:

1. In a machine for processing poultry, an eviscerating tool for insertion into the body cavity of the poultry through an opening at its vent and removal of the viscera of the poultry from the cavity through said opening upon withdrawal of the tool, said tool including:

a tube having a terminal end disposed adjacent said viscera when the tool is inserted into the cavity;
   an elongated post rigidly secured to the tube adjacent said end thereof,
   said post having a transversely round, exterior surface,
   a shaft rotatable in said tube and extending therethrough beyond said end; and
   a finger secured to the shaft for rotation therewith after the finger is disposed in said cavity,
   said finger having a transversely flat, inner face,
   said finger being disposed adjacent said post for gathering the viscera during rotation of the shaft, wrapping of the viscera around the finger with the viscera looped through the finger across said face and moving the viscera against said surface prior to and during withdrawal of the tool,
   said surface and said face being smooth, even and free of edges, projections and other sharp formations.

2. The invention of claim 1, and means on the post for reducing slippage of the viscera from between the post and the finger during withdrawal of the tool.

3. The invention of claim 2, said slippage reducing means comprising a pair of spaced abutments rigidly secured to the post.

4. The invention of claim 3, one of said abutments being a flange surrounding the post.

5. The invention of claim 4, said post being disposed alongside the tube and extending beyond said end of the tube within the path of travel of the finger terminating in a free end, said flange being disposed adjacent the terminal end of the tube and remote from the free end of the post.

6. The invention of claim 4, the other of said abutments being a prong spaced from the flange, said finger being disposed between the flange and the prong when holding the viscera adjacent the post.

7. In a machine for processing poultry, an eviscerating tool for insertion into the body cavity of the poultry through an opening at its vent and removal of the viscera of the poultry from the cavity through said opening upon withdrawal of the tool, said tool including:
  a tube having a terminal end disposed adjacent said viscera when the tool is inserted into said cavity;
  a post rigidly secured to the tube adjacent said end thereof;
  a shaft rotatable in said tube and extending therethrough beyond said end;
  a finger secured to the shaft for rotation therewith after the finger is disposed in said cavity;
  said finger being disposed adjacent said post for gathering the viscera during rotation of the shaft and moving the viscera against the post prior to and during withdrawal of the tool; and
  a guide having connection with the tube and looped about the finger for directing the latter into gathering relationship to the viscera after insertion of the tool into the cavity.

8. The invention of claim 7, and a pair of spaced abutments on the post for reducing slippage of the viscera from between the post and the finger during withdrawal of the tool, one of said abutments being an extension of said guide.

9. The invention of claim 1, said finger having a curvature for hooking the post when moving to a position holding the viscera against the post.

10. The invention of claim 1, said finger having a viscera-gathering hook extending laterally from the shaft for swinging movement toward and away from the post during rotation of the shaft, said post being in spaced parallelism with the axis of rotation of the shaft whereby the viscera is looped across the hook when the viscera is against the post.

11. The invention of claim 10, the post having a convex surface, said hook having a concave bight substantially mating with said surface when the viscera is against the post.

12. The invention of claim 11, said post having a free end; and holding means secured to the post across said end thereof for precluding slippage of the viscera off said end of the post and precluding slippage of the viscera from between the hook and the post during withdrawal of the tool from the cavity.

13. The invention of claim 12, and means on the post in spaced relationship to said holding means disposed for holding the viscera thereagainst by said finger when the viscera is looped across the hook.

14. In a machine for processing poultry, an eviscerating tool for insertion into the body cavity of the poultry through an opening at its vent and removal of the viscera of the poultry from the cavity through said opening upon withdrawal of the tool, said tool including:
  a tube having a terminal end disposed adjacent said viscera when the tool is inserted into said cavity;
  a post rigidly secured to the tube adjacent said end thereof;
  a shaft rotatable in said tube and extending therethrough beyond said end;
  a finger secured to the shaft for rotation therewith after the finger is disposed in said cavity;
  said finger being disposed adjacent said post for gathering the viscera during rotation of the shaft and moving the viscera against the post prior to and during withdrawal of the tool;
  said finger having a viscera-gathering hook extending laterally from the shaft for swinging movement toward and away from the post during rotation of the shaft, said post being in spaced parallelism with the axis of rotation of the shaft whereby the viscera is looped across the hook when the viscera is against the post;
  the post having a convex surface, said hook having a concave bight substantially mating with said surface when the viscera is against the post;
  said post having a free end;
  holding means secured to the post across said end thereof for precluding slippage of the viscera off said end of the post and precluding slippage of the viscera from between the hook and the post during withdrawal of the tool from the cavity;
  means on the post in spaced relationship to said holding means disposed for holding the viscera thereagainst by said finger when the viscera is looped across the hook; and
  a guide having connection with the tube and looped about the finger for directing the latter into gathering relationship to the viscera after insertion of the tool into the cavity.

15. The invention of claim 14, said holding means being integral with said guide.

* * * * *